Dec. 14, 1926.
G. E. PURPLE
1,610,315
HOLDER FOR BELT FASTENERS
Filed March 6, 1922
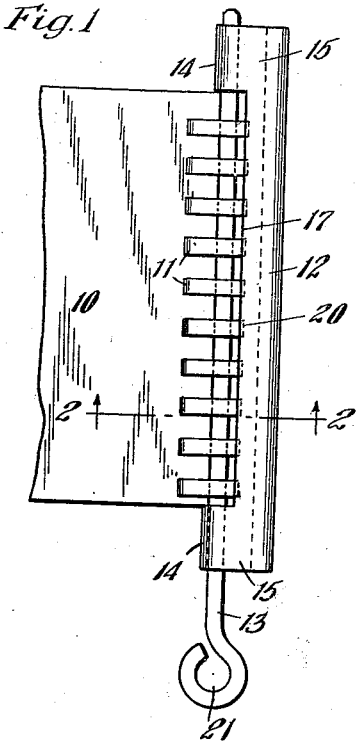
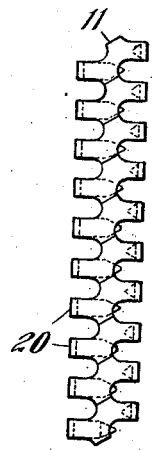
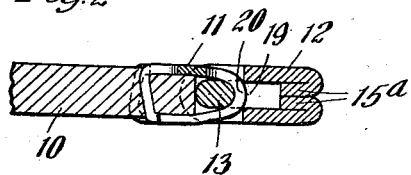
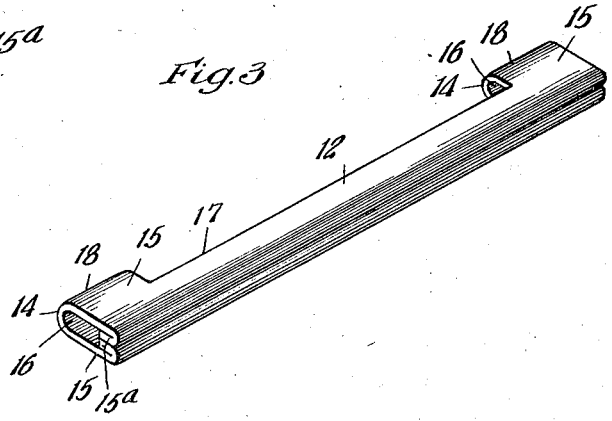
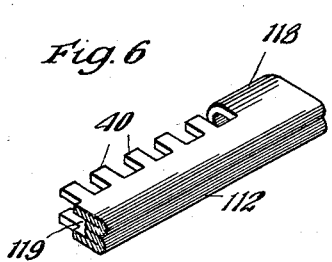
Inventor
George E. Purple
By Geo. I. Haight
His Atty.

Patented Dec. 14, 1926.

1,610,315

UNITED STATES PATENT OFFICE.

GEORGE E. PURPLE, OF CHICAGO, ILLINOIS, ASSIGNOR TO FLEXIBLE STEEL LACING COMPANY, OF CHICAGO, ILLINOIS, A CORPORATION OF ILLINOIS.

HOLDER FOR BELT FASTENERS.

Application filed March 6, 1922. Serial No. 541,330.

This invention relates to improvements in holder for belt fasteners.

One object of my invention is to provide an efficient, simple and inexpensive device for temporarily holding belt-lacing elements while being clinched to belt ends and for accurately gauging the lacing elements with respect to the belt ends so that they will be properly positioned for pivotal connection with corresponding lacing elements on the opposite ends of belts.

More specifically, an object of my invention is to provide a holder to be used in attaching belt lacings of the type described in my prior Patent 938,510, although the holder may as readily be adapted for use with the lacings of the individual hook type.

In the drawing forming a part of this specification, Figure 1 is a plan view of an end of a belt showing my improvements in connection therewith and with the belt-lacing element clinched or fastened to the belt end. Figure 2 is a sectional view corresponding to the section line 2—2 of Figure 1. Figure 3 is a perspective detail view of the holder proper without the retaining and gauge pin. Figure 4 is a plan view of a section of belt lacing such as shown in my said prior patent and with which my holder is adapted to be used. Fig. 5 is an end view of the belt lacing shown in Fig. 4. And Figure 6 is a sectional perspective view similar to Figure 3, illustrating my holder adapted for lacings of the individual hook type.

The flexible belt lacing disclosed in my said prior patent, preferably comprises two lengths of pronged metal originally formed of substantially V-cross section, the elements being clinched to the opposite ends of a belt and the fingers or arms thereof interlaced and a pivot pin passed through the interlaced portions of the elements so as to provide a flexible joint. In applying said belt lacings, it is highly desirable that the same be held so that they may be applied by a simple tool—such as a hammer or mallet —and also that they be properly gauged with respect to the ends of the belt so that the proper spacing will be left for the pivot pin when the two parts are connected.

In said drawing, 10 indicates one end of a belt, 11 one of the elements composing the flexible metallic belt lacing, 12 the main member of the holder and 13 the removable pin employed with the holder proper 12.

The holder proper 12, is preferably made from a flat sheet of metal which is folded back upon itself at its center so as to provide a folded or rounded edge 14, the two halves 15—15 of the folded plate or sheet being kept separated at the bend or fold 14 so as to leave an interior space 16 extended lengthwise. The inner edges of the two halves 15 are inturned, as indicated at 15ᵃ— 15ᵃ best in Figure 2 so that along the rear of the holder proper 12 four thicknesses of the metal are provided and a space is left between the two folded halves 15 equal to twice the thickness of the metal.

The forward side of the holder proper 12 is cut away for the major portion of its length, as indicated at 17, so as to leave at the ends forwardly extended loops 18—18, the space between the latter corresponding to the maximum length of the belt lacing 11 which is to be employed with that particular holder. With this arrangement, it will be noted, from an inspection of Figure 2, that a longitudinally extending seating groove or recess is provided at the bottom of the cut-away portion 17, as indicated at 19, within which will be partially accommodated the ridge or apex 20 of the belt lacing while the belt lacing is being clinched to the belt.

The removable pin 13 is extended lengthwise of the holder proper 12 and is accommodated within the loops 18—18 on the inner side of the ridge 20 of the belt lacing so as to hold the latter securely in place, as is clear from an inspection of Figure 2. Said pin 13 is preferably provided with an eye 21 at one end to facilitate its insertion and removal. It will also be noted from an inspection of Figure 2 that the pin 13 is elongated in cross section parallel to the belt, and this dimension of the pin, in conjunction with the loops 18 and the seating groove or recess 19, are made such that, when the pin bears against the end of the belt 10, the ridge of the belt lacing will be held away from the end of the belt a distance corresponding to the diameter of the pivot pin of the complete belt lacing plus approximately the thickness of the metal comprising the belt lacing, so that the two belt-lacing elements, when pivotally connected, will be accurately gauged without binding on the ends of the belt and without any lost motion at the pivotal connection.

In employing my improved holder, the belt-lacing element 11 is inserted within the recess 17 of the holder proper, the pin 13 is then inserted so as to hold the belt-lacing element in place, and the parts thus assembled are butted against the end of the belt and the prongs of the belt lacing then driven or clinched through the belt. After this the pin is removed and the same procedure is followed with respect to the other end of the belt, after which the two elements of the belt lacing 11 are interfitted and the pivot pin introduced.

Referring to the modification shown in Figure 6, it will be noted that the holder 112 is made in substantially the same manner as the holder 12 shown in the other figures but instead of cutting all the metal away between the end loops 118, the metal is so cut as to leave longitudinally spaced prongs 40—40 to accomodate therebetween belt lacings of the individual hook type. As will be evident, the prongs 40—40 being arranged in alined pairs, will act as spacers for the hook lacings, the ridges of which will be received or centered in the longitudinally extending guide or seating groove 119, as in the case of the arrangement previously described. As will be understood by those skilled in the art, a pin the same as shown in the other structures, will be employed with the arrangement of Figure 6.

From the preceding it will be seen that my improved holder may be manufactured at very small expense; it permits of the application of the belt lacing without the use of a vise or special tools other than a hammer or mallet; the holder may be easily grasped in the fingers at such a point as to avoid danger of mashing the fingers while clinching the lacing; and finally the belt lacing is accurately gauged while being applied.

As will be understood by those skilled in the art, the holders will be made in different sizes for different gauges of belt lacing and different widths of belt.

I have herein shown and described what I now consider the preferred manner of carrying out my invention but I am aware that various changes and modifications may be made without departing from the spirit of the invention, and such changes and modifications I contemplate as come within the scope of the claims appended hereto.

I claim:

1. A holder of the character described, comprising a metal sheet folded upon itself at its center, the edges of the two folded halves being inturned to thereby provide four thicknesses of the metal and leaving the two halves separated an amount equal approximately to two thicknesses of the metal, the holder being cut for the major portion of its length along its main folded edge and thereby leaving two forwardly extended loop ends adapted to accommodate a removable pin.

2. A temporary, relatively rigid, metal holder of the character described for a clinchable element of a flexible belt lacing and wherein said element is composed of metal of a predetermined thickness and is initially formed of substantially general V-form: said holder being portable and adapted to be held by the operator's fingers while being used and having a forwardly facing, elongated, seating groove to receive the apex of said element therewithin and center said element by engaging the outer face of the apex; a gauge pin arranged to be received within the apex of said element, said pin being of such cross section that it corresponds in its dimension perpendicular to the plane of the belt with the diameter of the pin of the complete lacing, and in its dimension parallel to the plane of the belt corresponds substantially to said diameter plus said thickness of metal; and means on said holder bearing a predetermined relation thereto, for retaining said pin in operative position relative to said holder, and said element in definite position in said groove relative to the holder during the clinching of said element to the belt, said lacing element being adapted to be attached without deformation of the holder by the clinching means, whereby the holder may be used repeatedly.

3. As an article of manufacture, a temporary holder proper for a clinchable element of a flexible belt lacing, said holder comprising: a single piece of sheet metal formed with integral, forwardly projecting, longitudinally spaced, pin-receiving bearings, one at each end thereof; and an elongated seating groove extending between said bearings, said seating groove being located rearwardly of said pin-receiving bearings and adapted to receive the apex of said element therewithin, the said holder being of an overall thickness corresponding substantially to the thickness of the size belt with which it is designed for use, the lacing element being adapted to be clinched without deformation of the holder by the clinching means, whereby the holder may be reused.

4. A holder of the character described, including a metal sheet folded upon itself and with the portions extending from the line of fold in spaced relation, said holder being cut out for the major portion of its length along the folded edge to thereby leave two forwardly extended loop ends adapted to accommodate a pin and provide, by said spaced portions of the sheet, a longitudinally extending seating groove intermediate said loop ends and alined therewith.

In witness that I claim the foregoing I have hereunto subscribed my name this 1st day of March 1922.

GEORGE E. PURPLE